Aug. 24, 1954  H. M. GULICK ET AL  2,687,448
BATTERY CAP APPARATUS
Filed Feb. 3, 1953  4 Sheets-Sheet 1
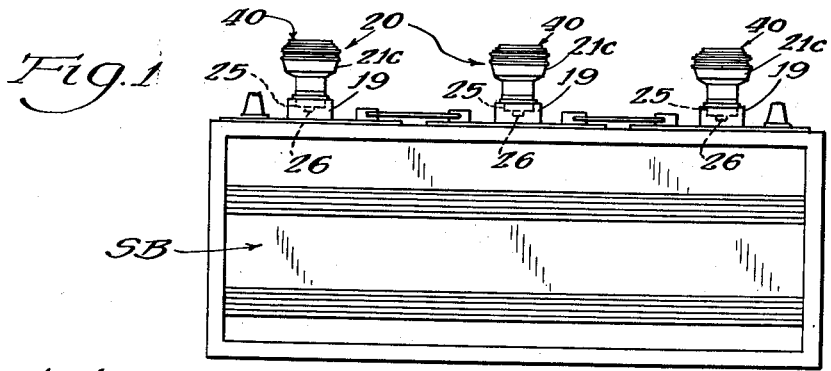
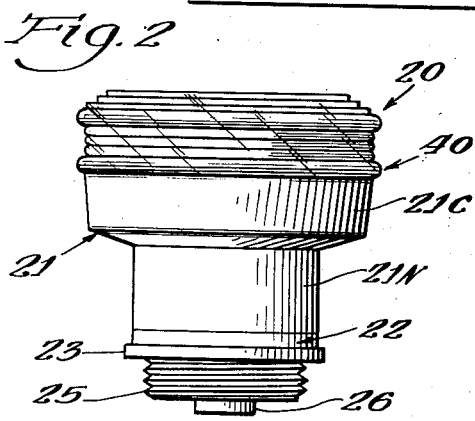
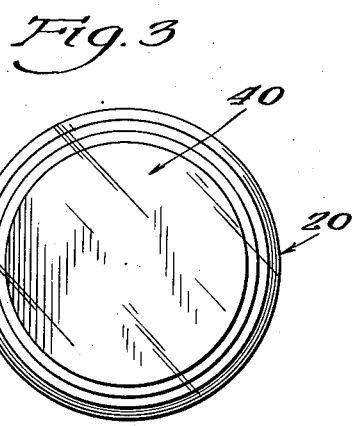
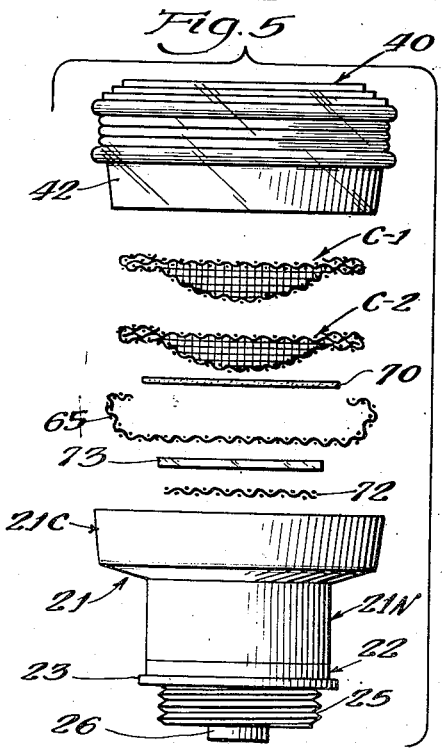
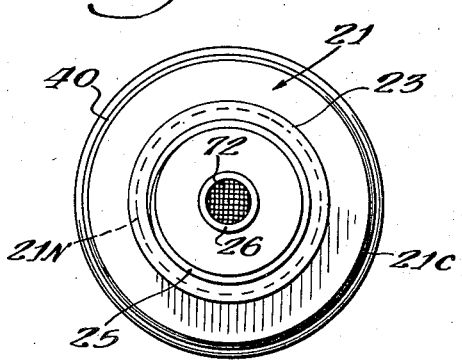
Inventors:
Harold M. Gulick
Cresswell E. Stedman
By: Wallace and Cannon
Attorneys Aug. 24, 1954
H. M. GULICK ET AL
2,687,448
BATTERY CAP APPARATUS
Filed Feb. 3, 1953
4 Sheets-Sheet 2
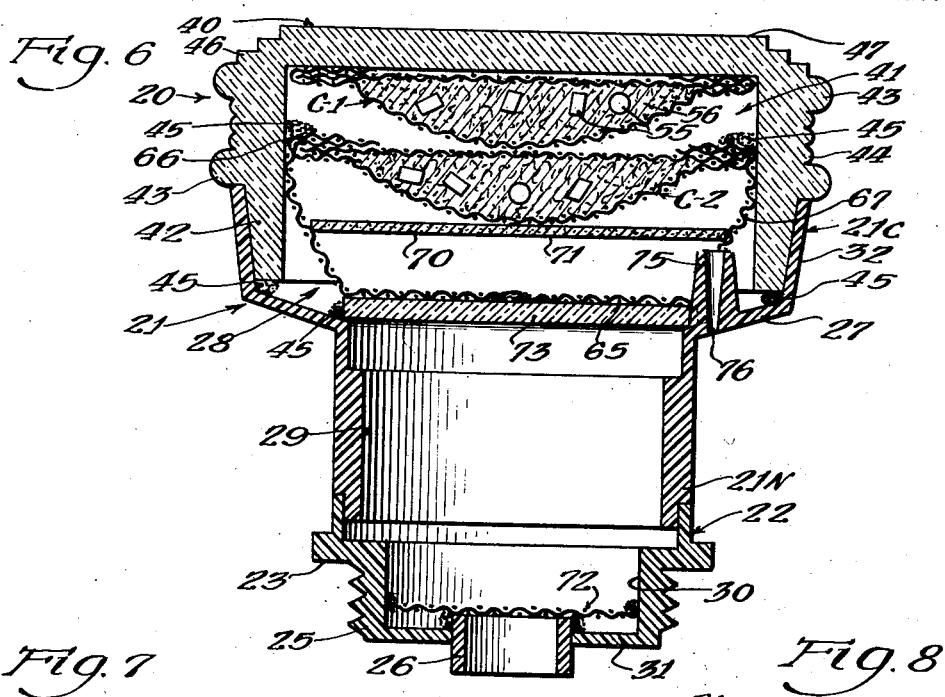
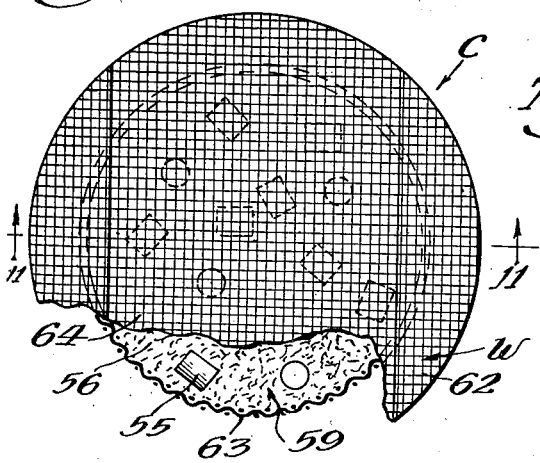
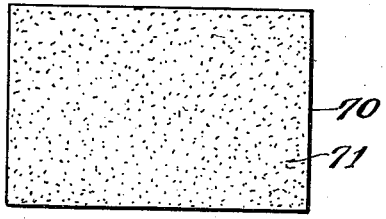
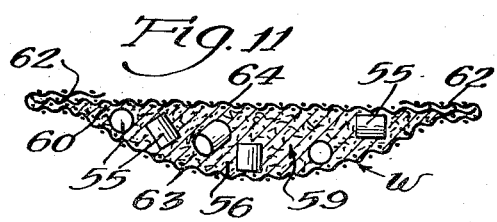
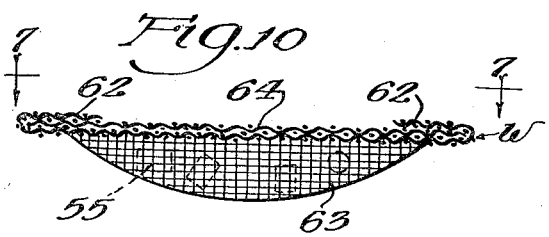
Inventors
Harold M. Gulick
Cresswell E. Stedman
By: Wallace and Cannon
Attorneys Aug. 24, 1954  H. M. GULICK ET AL  2,687,448
BATTERY CAP APPARATUS Filed Feb. 3, 1953  4 Sheets-Sheet 3

Inventors:
Harold M. Gulick
Cresswell E. Stedman
By: Wallace and Cannon
Attorneys Aug. 24, 1954
H. M. GULICK ET AL
2,687,448
BATTERY CAP APPARATUS
Filed Feb. 3, 1953
4 Sheets-Sheet 4
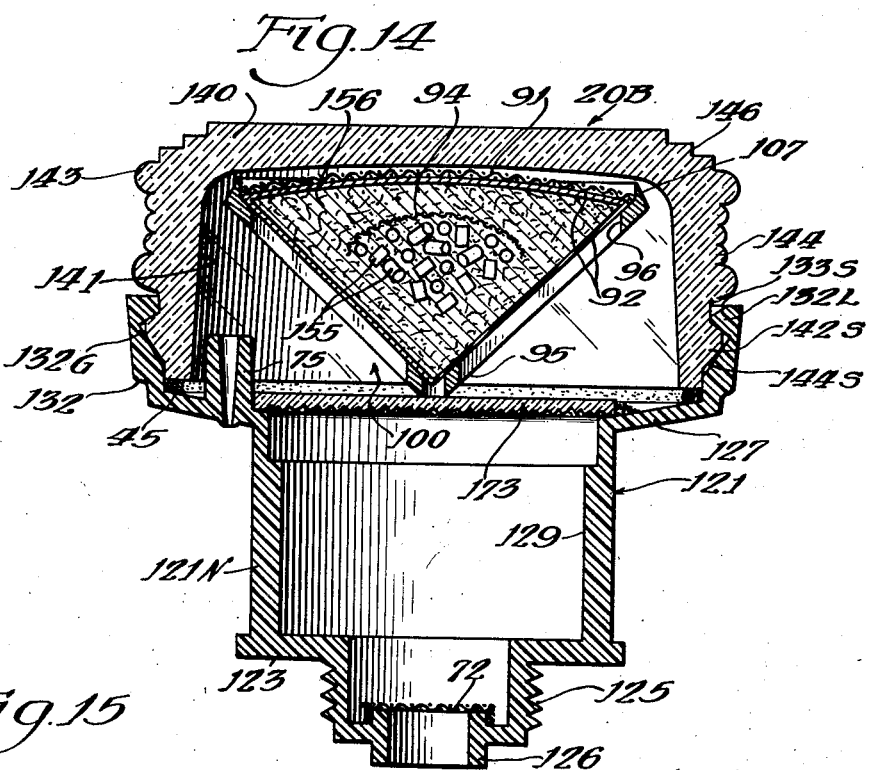
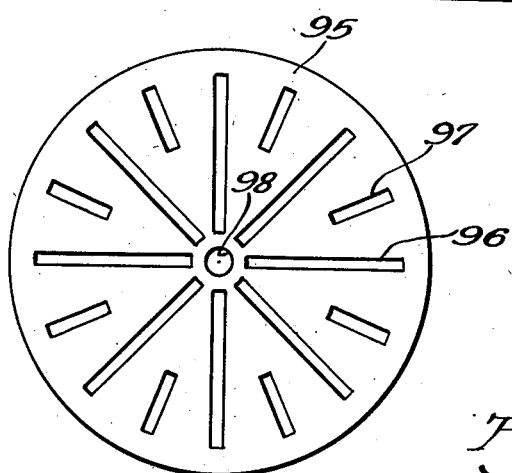
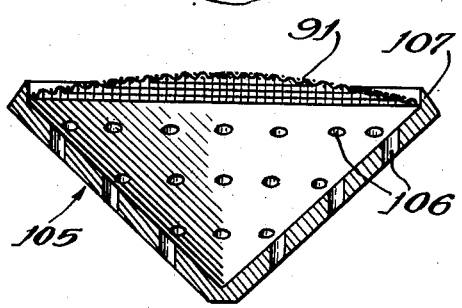
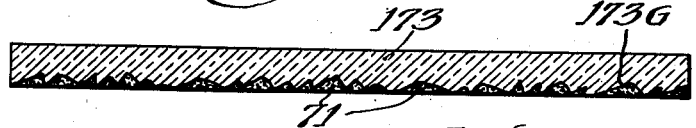
Inventors:
Harold M. Gulick
Cresswell E. Stedman
By: Wallace and Cannon
Attorneys Patented Aug. 24, 1954

2,687,448

UNITED STATES PATENT OFFICE 2,687,448

BATTERY CAP APPARATUS

Harold M. Gulick, Miami, and Cresswell E. Stedman, Coral Gables, Fla., assignors to Industrial Research, Inc., Miami, Fla., a corporation of Florida Application February 3, 1953, Serial No. 334,814

24 Claims. (Cl. 136—179)

This is a continuation-in-part of our application Serial No. 240,830, filed August 8, 1951, now abandoned.

This invention has to do with electrolytic cells in the form of storage batteries or the like, particularly for use in connection with automotive vehicles, and is concerned primarily with the provision of a relatively small catalytic reactor unit that is adapted to increase the efficiency of such a storage battery.

It has been recognized heretofore that it would be desirable to recombine the hydrogen and oxygen gases that are evolved from electric storage batteries primarily as a result of an overcharging of the battery. This would be desirable for the reason that hydrogen and oxygen thus evolved from the battery may be used to re-form chemically pure water that would otherwise be dissipated and lost, causing an impairment of the efficiency of the battery. However, the proposals heretofore known for thus recombining hydrogen and oxygen have not been commercialy feasible, and what is more, many such proposals are mechanically as well as chemically inoperative. Thus, there are many problems present in what appears to be an otherwise meritorious proposal. For instance, the only feasible manner presently known for effecting such a recombination of hydrogen and oxygen in view of the conditions under which the gases must be recombined, is resort to a catalytic reaction that causes the recombining of hydrogen and oxygen to proceed at an accelerated rate characterized by the evolution of a large amount of heat. Naturally, such a catalyzed reaction occurring in the presence of hydrogen gas represents a hazard, and this is particularly so in view of the fact that the formation of water vapor from its elemental substances is an exothermic reaction. This is one problem that must be reckoned with, and accordingly it is an object of the present invention to permit a catalytic recombination of hydrogen and oxygen gas as evolved from storage battery operations to proceed under conditions that guard against any undue hazard occasioned by the presence of large amounts of heats of reaction and the presence of explosive hydrogen gas. A further and related object in this connetcion is to largely dissipate the heat of reaction accompanying the formation of water vapor from hydrogen and oxygen gases evolved from, and produced during the use of, a storage battery of the type that is to be periodically re-charged to condition the battery for a proper discharging cycle.

Since the present invention depends primarily upon the use of a catalytic reactor as applied to, and adapted for, a storage battery, it is essential that the catalyst be maintained as dry as possible and therefore free from water vapors that might possibly be condensed near or around the catalyst as the hydrogen and oxygen gases are catalytically recombined by the catalyst. This is essential for the reason that the effectiveness of the catalyst is very largely impaired in the event that the catalyst becomes wet or dampened. A further object of the present invention, therefore, is to assure that the catalyst in the reactor is maintained free of water or other liquids that may contaminate or poison the catalyst.

As storage batteries are presently constituted, metallic antimony is generally used in forming a cast lead-antimony alloy grid which functions as a plate for the lead dioxide which constitutes the active material of the positive electrode. This alloy grid tends to corrode during use of the cell to form stibine gas, $SbH_3$, a highly corrosive vapor which contaminates and reduces the efficiency of the catalyst used to effect a recombination of the hydrogen and oxygen gases. It is a further object of the present invention, to counter-act or neutralize stibine gas thus formed so that the hydrogen-oxygen reaction may proceed on a catalytic surface that is free of the contaminating influence of stibine.

A further object of the present invention is to afford a novel unit for use in a storage battery that embodies a catalytic reactor adapted to catalyze the hydrogen-oxygen reaction to form water from the gases evolved as the result of an over-charging of the storage battery, and to arrange other parts in combination therewith so that contamination, corrosion, wetting and the like deleterious effects on the catalytic reactor may be eliminated and guarded against in a practical and working manner.

A further object of the present invention is to increase the efficiency of storage batteries.

One of the reasons why prior proposals in this field have not met with success and have been found to be inoperative and impractical is that explosions have been accompanied any attempt to provide a means for catalyzing the hydrogen-oxygen reaction. It is our belief that this is due to the fact that hot spots develop on the surface of the catalyst, that is, points whereat the hydrogen-oxygen reaction proceeds to completion to the exclusion of such reactions occurring uniformly on the remainder of the surface area of the catalyst. This results in an over-heated catalyst that increases the danger of an explosion. A further object of the present invention, therefore, is to assure that the hydrogen and oxygen are uniformly passed to the catalyst surface, that is, that no one point on the catalyst surface is subjected to the possibility of excessive heats of reaction developed thereon, or to the possibility that such area will be exposed to contact by the reactant gases to the exclusion of surrounding areas. A further object in this regard is to control the activity of the catalyst, and to control the rate at which the hydrogen-oxygen reaction proceeds.

Other further objects of the present invention will be apparent from the folowing description and claims and are illustrated in the accompanying drawings which, by way of illustration, show a preferred embodiment of the present invention and the principle thereof and what we now consider to be the best mode in which we have contemplated applying that principle. Other embodiments of the invention embodying the same or equivalent principle may be used and structural changes may be made as desired by those skilled in the art without departing from the present invention.

Fig. 1 is a side elevational view of a conventional three-cell electric storage battery showing three of the new catalytic reactor battery units mounted in combination therewith;

Fig. 2 is an exploded view of a catalytic reactor unit arranged to embody the principles of the present invention;

Fig. 3 is a top plan view and Fig. 4 is a bottom plan view of the catalytic reactor illustrated in Fig. 2;

Fig. 5 is a side elevational view showing the various parts comprising the catalytic reactor unit of the present invention;

Fig. 6 is a sectional view on an enlarged scale of the catalytic reactor unit for storage batteries shown in Fig. 2;

Fig. 7 is a top plan view, broken away in part, of one of the catalytic compacts or units embodied in the catalytic reactor unit of the present invention;

Fig. 8 is a side elevation view of a means that may be used to neutralize stibine gas;

Fig. 9 is a plan view of the element illustrated in Fig. 8;

Fig. 10 is a side elevation view of the catalytic compact of Fig. 7;

Fig. 11 is a sectional view taken on the line 11—11 of Fig. 7;

Fig. 14 is a sectional view of a battery cap unit embodying still another form of catalyst unit;

Fig. 15 is a sectional bottom plan view taken through a catalyst holder;

Fig. 16 is a sectional view of a baffle; and

Fig. 17 is a horizontal sectional view taken through the holder shown in Fig. 15.

Figure 12:
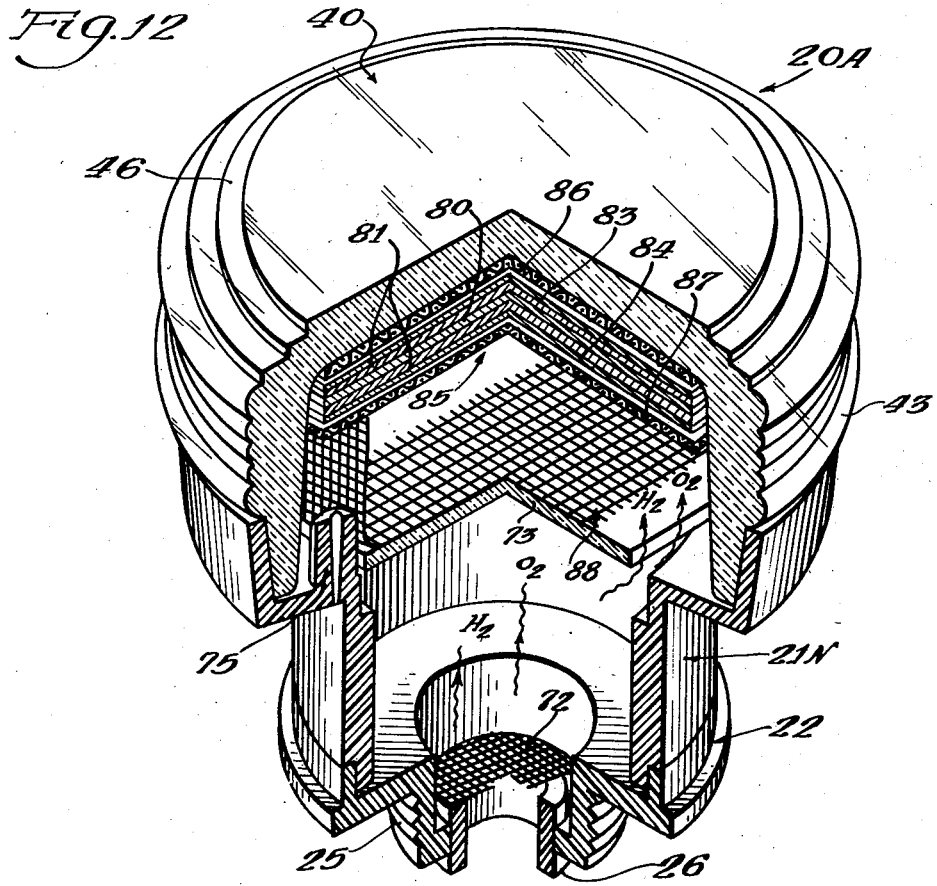
Fig. 12 is a perspective of the reactor unit of the present invention, broken away in part to illustrate a modified form of the catalytic unit.

The present invention is concerned primarily with that type of storage battery wherein an electric current is caused to flow through the battery as the result of a characteristic chemical reaction which proceeds in a forward direction during the so-called "discharge" cycle of the battery, the aforesaid chemical reaction being caused to proceed in the reverse direction to regenerate the reactants, consumed during discharge, by the passage of an external and independent electric current through the battery during the so-called "charging" cycle. Thus, the present invention has particular utility in connection with the lead storage cell commonly used in automotive vehicles and the like wherein reactants in the form of metallic lead, lead dioxide, and sulphuric acid react during the discharge cycle to form lead sulphate and water and create an electric current as the result of such reaction. This discharging action of the lead storage cell results in a consumption of the reacting materials, and consequently it is necessary to recharge the cell to reproduce or regenerate the reactants, this being accomplished by introducing into the cell an external potential higher than that of the cell itself. During this latter electrolysis to re-form lead, lead dioxide and sulphuric acid to rejuvenate the cell, electrolysis should not exceed a condition wherein all the free lead originally present is redeposited on the cathode, for beyond this point the battery becomes over-charged manifest in an evolution of hydrogen at the lead surface, that is, at the cathode, and oxygen at the lead dioxide surface, that is, at the anode. Such over-charging results in consumption of the battery water, a measured quantity of which constitutes an essential element of the lead storage cell, with a consequent increase in the relative amount of sulfuric acid, and this results in material injury to, and corrosion of, the electrodes.

It is, therefore, the recharge cycle that represents the critical factor of storage battery operation, for the efficiency and the life of the cell are both adversely affected by a loss of water, and the present invention is adapted to assure that any over-charging which may occur during the recharge cycle will be counteracted by a regeneration of battery water from the constituent hydrogen and oxygen gases resulting from an electrolysis of the battery water molecules during such over-charge.

For purposes of disclosure, the present invention is herein illustrated as embodied in a catalytic reactor battery unit 20 that may be connected to or made a part of a storage battery such as the three-cell storage battery SB illustrated in Fig. 1. The particular manner in which the catalytic reactor 20 is made a part of the storage battery or other electrolytic cell will be largely a matter of convenience, and for purposes of disclosure in the present instance this may take the form of a threaded connection or attachment to the usual socket as 19, Fig. 1, located at the top of each cell of the battery SB.

The reactor 20 in the present instance is illustrated as being in the form of a cap-like member that comprises a funnel-shaped housing 21 defined generally by an upper cup-shaped part 21C and a hollow stem 21N of reduced diameter extended downwardly therefrom. The upper part 21C includes an annular, slightly outwardly-flared vertical wall 32, Fig. 6, and a bottom wall 27 that slopes downwardly toward the stem 21N. It will be observed that the bottom wall 27 divides the housing 21 into two hollow sections, an upper cylindrical chamber 28, in which certain parts are located as will be pointed out hereinbelow, and a lower rather wide vertical passageway 29, Fig. 6, in communication therewith. The housing 21 may be made of any desired material, such as a polystyrene plastic.

Sealed in an air-tight fashion to the lower end of the stem 21N is an externally threaded sleeve-like base 22, the threaded portion 25 of which is adapted to be threaded into the socket 19, Fig.

1, of the lead storage cell SB so that the bottom of an annular flange 23 on the base 22 will seal off the top of the socket 19. The base 22 is also preferably formed of a suitable plastic and is provided with a vertical passageway 30 leading from the hollow stem 21N and a bottom wall 31 in which is located a relatively short tube 26 by means of which the upper chamber 28 and passage 29 of the reactor unit 20 may be placed in communication with the air space of the particular electrolytic cell with which the reactor 20 is to be used. Thus, once the reactor unit 20 is mounted in position of use as in Fig. 1, it in reality represents an extension of the storage cell.

The chamber 28 that is afforded interiorly of the cylindrical cup-shaped part 21C is enclosed and covered by a hollow cap 40 which includes an annular side wall or depending skirt 42 that is so tapered as to correspond to the flare or slope of the wall 32 of the housing 21 so as to be telescoped within the housing 21 as shown in Fig. 6. Sealing material as 45 is used to assure an air-tight seal between the parts 40 and 21. The cap 40 is preferably made of Pyrex glass, and when properly nested or telescoped with respect to the housing 21 as shown in Fig. 6, the bottom of an annular rib 43 of the cap 40 rests flush on the top edge of the housing 21. The arrangement is such as to afford a reactor chamber 41, Fig. 6, in which a pair of catalytic reactor compacts, C-1 and C-2, are located in a manner that will be described in detail hereinbelow. Thus, it is in the chamber 41 that the catalyzed reaction between hydrogen and oxygen will be brought about and since, as was mentioned hereinabove, the hydrogen-oxygen reaction is characterized by the evolution of heat, the exterior of the glass cap 40 is marked off by a pair of relatively large, rounded annular ribs as 43 between which are located a plurality of similarly shaped but smaller ribs 44, thus to afford an increased surface area for conducting heat away from the reactor chamber 41. For a similar purpose, annular ribs 46 are cascaded downward from the top 47 of the glass cap 40.

It will be seen that when the catalytic reactor unit 20 is mounted in position of use as shown in Fig. 1, the reactor chamber 41 will communicate directly with the interior of the particular electrolytic cell in which hydrogen gas and oxygen gas may be evolved at the cathode and anode, respectively, of the cell during the time that the same undergoes an electrolysis as may be caused by an over-charging external current. As will be described in more detail below, these gases eventually reach the reactor chamber 41 whereat the hydrogen and oxygen are catalytically combined to form water vapor that eventually is returned to the electrolytic cell in liquid form to maintain the delicate balance between the battery water and the sulphuric acid. To this end, the pair of catalyst compacts C-1 and C-2 are secured to the underside of the cap 40 within the reactor chamber 41 and above the chamber 28 in the housing 21. Each of the compacts C, Fig. 7, comprises a catalytic material in the form of catalyst pellets 55, as for instance activated platinum or palladium pellets, and this catalyst material is packed in and surrounded by a very finely divided catalyst carrier 56 which in the present instance consists of finely divided or chopped asbestos fibers coated with a gas-permeable, liquid-repelling substance such as Teflon or one of the silicone resins the water repellency of which is a well known characteristic. This coating material for the asbestos fibers will be described in more detail hereinbelow, but it may be mentioned that the asbestos fiber is divided to such an extent that the fibrous nature is almost lost, assuming a powdery or flaky condition that may aptly be described as pulverulent.

As shown in Figs. 6, 7, and 11, the catalytic pellets 55 in the compacts C are each insulated one from another by the intervening highly-compacted sections of the porous body 56 so that in effect the pellets are floated in a porous insulation. The compacts themselves are generally circular in outline and are relatively flat or disc-shaped as shown in Fig. 10, a central mound 59 of the finely divided asbestos carrier being surrounded by an annular or flattened portion 60 of the same material, Fig. 11. This configuration of the catalyst compact is afforded by two pieces, 63 and 64, of wire mesh screen W, preferably consisting of non-corrosive nickel-plated brass wire, so shaped as to contain the catalyst carrier 56 in the space that is afforded between the top, or rounded, and the base, or flat, wire mesh pieces 63 and 64 respectively. Ends 62 of the top wire mesh piece 63 are bent around and under the corresponding ends of the base mesh 64 as shown in Fig. 10. The edges of the thus-arranged wire mesh screens may be crimped together, stapled or otherwise secured to form a self-sustaining compact of catalytic unit.

The compacts C-1 and C-2 are each located in the reactor chamber 41 with the flat base portions 64 thereof facing upwardly toward the underside of the cap 40 so that the humped parts 59 containing the catalyst pellets 55 face downward toward the passages 29 and 30 leading to the electrolytic cell. As a means for maintaining the compacts in place, additional spots of adhesive as 45 may be conveniently employed as shown in Fig. 6. In this manner, the catalytic compacts C-1 and C-2 are located in the reactor chamber 41 with the catalyst 55 in position to be exposed to the gases which originate in the electrolytic cell and which will rise up into the reactor chamber 41 through the short tube 26 and the passageways 29 and 30.

In accordance with the present invention, the reactor unit 20 also embodies a means for counteracting stibine gas so that the deleterious and highly corrosive effect of this substance may be eliminated. In the present instance, this means may be in the form of a separate unit mounted immediately beneath the lower of the two catalyst compacts, C-2, and includes a loosely woven fabric strip or other self-sustaining porous body 70, Fig. 8, impregnated with an oxidizing agent 71 such as lead dioxide, hydroquinone or the like substance which will be effective to oxidize the hydrogen in stibine, $SbH_3$, to thereby neutralize this highly corrosive catalyst contaminate. In the present instance, the impregnated strip 70 is set upon a relatively narrow nickel-coated brass wire mesh screen support 65 which is adhesively attached at one end 66 to the back of the lower compact C-2 as by adhesive 45, Fig. 6, and this support 65 is then bent so as to extend beneath the lower compact C-2 from one side of the reactor chamber 41 across to the other side. Thus, the wire mesh support 65 may first be pre-bent and then secured to the compact C-2, and after the catalyst compacts are each located in the reactor chamber 41 the impregnated neutralizer strip 70 may then be placed in position at the inside of the bend in the wire mesh support 65 whereupon the free end 67 of the latter is pressed up into the reactor chamber 41 at the other side of the cap 49 as shown in Fig. 6. The stibine neutralizer is thus in position to intercept the gases streaming upwardly through the chamber 28 toward the reactor chamber 41. Preferably, as a safe-guard, the tightly-compacted asbestos catalyst carrier 56 in each of the catalyst compacts is also impregnated with a stibine oxidizer 71 as a further assurance that no contaminating stibine reaches the catalyst pellets 55.

As a further safeguard to the neutralization of stibine gas and the preventing of liquid water reaching the catalyst pellets, water-proof asbestos paper, impregnated or coated with lead dioxide or the like, may be used as a liner for the catalyst compacts C–1 and C–2.

Located in the neck of the chamber 28 is a square baffle 73, Fig. 6, secured in position by adhesive 45 applied to the four corners of the baffle 73 that rest upon four corresponding points on the lower edge portion of the bottom wall 27. The baffle 73 functions to prevent liquid sprays or mists of water or acid from gaining access to the chambers 28 and 41 in any appreciable amount. At the same time, since the baffle is square, the hydrogen and oxygen gaseous reactants may pass up into the chamber 28 and 41 in the space that is afforded between the edges of the baffle 73 and the corresponding edges of the circular, downwardly sloped bottom wall 27. Thus, any liquids impinging on the bottom of the baffle 73 will be diverted back down into the passages 29 and 30. In this same connection, it may be pointed out that an additional wire mesh screen 72 of nickel-coated bronze is secured across the neck of the passageway 30 and the top of the short tube 26 as shown in Fig. 6, so that any liquids, mists, or sprays tending to enter the reactor unit 20 from the electrolytic cell may be interrupted in the first instance.

In the practice of the present invention we have found that improved and unexpected efficiency of battery cap catalytic reactor unit has been obtained by coating the individual fibrous particles in the porous catalyst carrier mass 56 with a suitable water-resistant but gas-permeable coating, and for this purpose we have found that either Teflon or the so-called silicone resin coatings are admirably suited since they may be applied effectively as a very thin coating to the particles comprising the pulverulent fibrous catalyst carrier 56. These coating materials, by virtue of their water repellency and surface tension characteristics, prevent the transmission of water by capillarity through the fibrous carrier mass 56, but, at the same time, the thus-coated porous catalyst carrier 56 is very highly gas-permeable by virtue of the multitude of tiny labyrinthine passageways therein so that the hydrogen and oxygen gases which are evolved from the cells of the electric storage battery as SB may eventually uniformly contact and impinge upon the external surfaces of the catalyst pellets 55 at a multitude of points to be recombined thereupon into water. The water-resistant but gas-permeable coating may be applied to the fibers of the porous catalyst carrier 56 in any suitable manner before the catalyst pellets 55 are embedded therein.

For instance, we have found that the mass of the porous catalyst carrier 56 may be suitably coated as follows: A suitable quantity of asbestos fiber is washed with water (such washing with water may be omitted if the asbestos fiber is of suitable quality), filtered through a screen, partially dried in air, then washed with acetone and dried for from 8 to 24 hours at 150° C., with occasional stirring or, if desired, the fibrous asbestos may be dried at a higher temperature of 300° to 400° for a shorter period of about 4 hours, with occasional stirring, until complete drying, which is essential, is assured. The thus completely dried asbestos fiber is then immediately rendered water and moisture resistant, but gas-permeable, by mixing it with a 20 per cent solution of DC-200 silicone resin (silicone hydrochloride) dissolved in carbon tetrachloride. Excess of the latter may be removed from the thus-coated asbestos fiber by air or oven drying, whereupon the thus-coated asbestos fiber is heated at a temperature of from 300° to 325° C. in a muffle furnace, with occasional stirring, until it ceases to evolve white smoke vapors. The temperature range of 300° to 325° is quite critical, since temperatures below 300° C. are inadequate to drive off all of the white smoke vapors (hydrogen chloride in air) which are evolved during this heating operation while temperatures above 325° C. tend to destroy the silicone resin coating. The final heating operation thus carried out leaves a water repellent film of silicone. The finished product is then tested by floating a specimen thereof on water, and the test is satisfactory if the specimen will float on water while, at the same time the thus-coated fibers remain dry and not wet by the water. It will be appreciated of course that the asbestos fibers are placed in a very finely divided and highly compacted condition for use in the reactor unit 20.

The same general procedure may be followed with other coating materials found to be satisfactory for the intended purpose outlined above, as for instance a Teflon coating.

The catalyst container or compacts as C–1 and C–2 may then be assembled first by tightly packing a mass of the coated asbestos fiber 56, placing a plurality of the catalyst pellets 55 in the mass of asbestos fiber, covering the catalyst pellets 55 with more coated asbestos fiber, then forming the mass of coated asbestos fiber containing the catalyst pellets 55 into a compact by means of the wire mesh screens W which provide the annular portion 60 and the hump 59 that characterize the shape of the catalyst compact, and finally securing the compact by crimping together or otherwise securing the edges of the wire mesh pieces 63 and 64. The thus completed catalyst containers or compacts C may then be placed in the reactor chamber 41 (while the latter is in inverted position) and sealed in position by means of the spots of adhesive 45 as aforesaid. The lower of the compacts C–2 will have the support 65 secured thereto, and the free end 67 of the latter is tucked in place after the stibine eliminator 70 is properly located as shown in Fig. 6.

In the use of the catalytic battery cap reactor 20, the same is located in position of use on the battery SB by screwing the externally threaded attaching base 22 into the internally threaded socket 19 of the battery SB. Any hydrogen and oxygen gases evolved from within the electrolytic cell will tend to rise upwardly therein and enter the reactor unit 20 through the tube 26 at the bottom thereof. Liquid sprays, water mists, acid aerosols, and the like liquid dispersions are largely eliminated, if not altogether, by the screen 72 and the baffle 73, and in any event are denied contact with the catalyst 55 by the asbestos mass 56, the individual fibers of which are coated as aforesaid to prevent the passage of liquid therethrough. The stibine gas which may be present in the chamber 28 as a result of the corrosive action of acid on the antimony-alloy electrode is neutralized by the oxide-impregnated strip 70.

Eventually, therefore, hydrogen and oxygen gases alone reach the catalytic units C–1 and C–2, the labyrinthine passages in the tightly compacted, finely divided asbestos mass 56 of the latter assuring that as these gases permeate the carrier 56 to reach the catalyst pellets 55 the incremental catalyzing surfaces of the catalyst pellets each receive equal amounts of gaseous reactants so that a uniform distribution of reactant surrounds and contacts each catalyst pellet. In effect, by offering a resistance to the hydrogen-oxygen gas flow, the labyrinthine passages in the porous carrier 56 effect a metering of the gas flow. Accordingly, no incremental catalyst area ever receives any suddenly increased supply of reactant or more than a pro-rated quantity.

The catalyzed hydrogen and oxygen reaction on and around the catalyst pellets 55 is self-propagating in that as water vapor is formed, the volume of reactant gases is reduced by one-third and this results in a vacuum within the reactor chamber 41 which causes more and more of the reacting hydrogen and oxygen gases to be drawn toward the catalyst material.

Water vapor formed by the catalyst action tends to rise within the chamber 41 because of its elevated temperature, and this action causes additional reactant gases to be drawn upwardly into the chamber 41 from the battery cell. Consequently, the condensation of water vapor occurs principally on the inside walls of the glass top 40 and drains downwardly toward the glass baffle 73, and this downward flow of liquid at the baffle 73 tends to strip and absorb any sulfuric acid at this point. In other words, the baffle 73 may be looked upon as a surface upon which there occurs a downward flow of re-formed battery water and an upper or counter-flow of gases and fluids originating in the battery cell.

The nature of the catalyst carrier 56 in the present instance is of particular significance since its porous nature is effective to assure that excessive temperatures are not reached at localized spots on the surface of the catalyst material during rapid reaction conditions. At the same time, however, where temperatures are low, as may be occasioned by a slow catalysis and low rate of hydrogen-oxygen flow into the reactor chamber, the porous carrier 56 is effective to maintain a temperature well above the condensing temperature of water vapor. Moreover, the gas-permeable, liquid-repellent nature of the individual fibers comprising the carrier 56 is not conducive to the condensation of water vapor, and is effective in this regard to direct water vapor downward and away from the catalyst 55 rather than to present a surface responsive to the tendency for water vapor to condense thereon.

Excessive vacuums in the reactor 20 are, of course, undesirable and to the end that this may be prevented a vent 75 having a vent opening 76 extends into the chamber 28 from a point on the bottom wall 27. The reactor chamber 41 is thus in communication with the atmosphere so that the pressure therein may be exposed to the stabilizing influence of atmospheric pressure. At the same time, the vent 75 affords a fluid outlet in the event the chamber 28 were to be suddenly flooded with the electrolyte from the battery cell.

Figure 13:
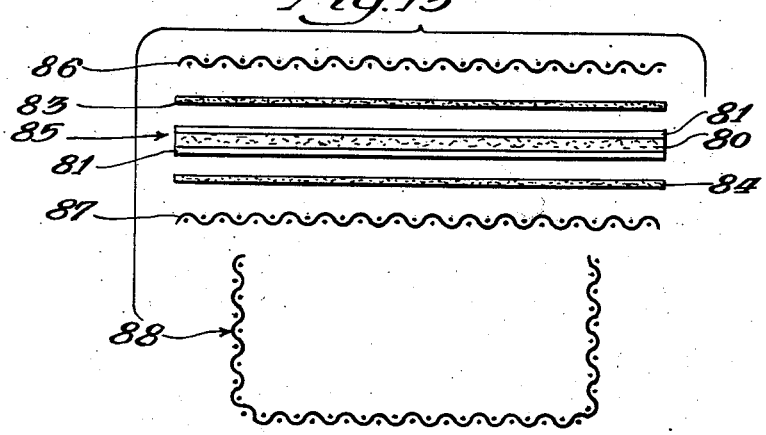
Fig. 13 is an exploded view of the catalyst unit embodied in the reactor unit of Fig. 12.

In Figs. 12 and 13 there is shown a modified form for the catalyst unit, the reactor unit 20A itself being otherwise essentially the same as unit 20. In this instance, the catalyst assumes the form of a platinum or palladium coating, applied to a piece of asbestos paper which has been waterproofed with Teflon or silicone resin coating as described above in connection with the fibrous, particulate or pulverulent carrier mass 56. Thus, a strip of asbestos paper 80 is first rendered waterproof and then coated on either side with the catalyst 81 in the form of a platinum or palladium catalyst paste of a known type. The coated strip 80 is then surrounded by a highly porous carrier in the form of two pieces of waterproofed asbestos paper 83 and 84 of a size corresponding to the piece 80. The asbestos papers 83 and 84 are each preferably impregnated with an oxidizing agent for neutralizing stibine, $SbH_3$, and the three asbestos strips 80, 83 and 84 are then arranged between a pair of nickel-plated bronze wire screens 86 and 87 to constitute a self-sustaining catalyst unit generally indicated at 85.

The catalyst unit 85 is mounted in the reactor chamber 41 somewhat differently than in the case of the compacts C–1 and C–2, and in this instance a nickel-coated bronze wire strip 88 is bent to a somewhat inverted U-shape and the opposite ends secured to opposite sides of the catalyst unit 85. The bight portion of the strip 88 is then set on the glass baffle 73 that is placed in the housing 21 for the purpose of deflecting droplets, liquid mists, acid sols and the like back into the electrolytic cell. In this manner, the catalyst unit is suspended within the reactor chamber in position to intercept gases rising upwardly therein toward the underside of the cap member 40. If additional safeguard against stibine gas is desired, an oxide-impregnated strip may be arranged between the legs of the foraminous strip 88 much in the same manner as the equivalent oxide-impregnated strip 70, Fig. 8, is arranged on the wire strip 65.

In use and operation, the catalyst unit 85 functions in a manner essentially the same as the compacts C–1 and C–2. Thus, referring to Fig. 12, the water constituent gases $H_2$ and $O_2$, generated in the electrolytic cell to which the reactor unit 20 is attached, rise through the passageways 26 and 29 into the reactor chamber wherein the catalyst unit is suspended. The highly porous nature of the asbestos papers 83 and 84 assures the metering of a regular or uniform form of reactant gases on to the catalyst surfaces 81, and at the same time the water resistant but gas permeable coatings on the asbestos strips 80, 83 and 84 assures that the catalyst does not become wet.

Instead of arranging the catalyzed asbestos paper 80 between pieces of asbestos paper 83 and 84 as illustrated in Fig. 13, the same may be packed in and surrounded by the carrier 56 described in detail above. Similarly, the foraminous screens 63, 64, 86 and 87 are not essential and may be replaced, if found satisfactory, by a porous ceramic carrier.

While the present invention has been illustrated and described from the standpoint of several embodiments, it will be appreciated that further modifications may be had and equivalents substituted as may be desired, as for instance in the shape and arrangement of the catalyst units and the other features thereof which are not critical. Also, the reactor unit 20 itself may be so constructed as to represent an integral part of an electrolytic cell, and in this connection it may be mentioned that the lead storage cell herein referred to for purposes of disclosure is but one example of the field of use, and other adaptations may be had wherever a re-formation of water vapor from its elemental substances as evolved from electrolysis may be desired. Various substances may be substituted as for instance the material from which the reactor unit 20 is constructed, the particular oxidizer in the stibine neutralizer, and the coated carrier 56 among others. In this connection, it is of importance to point out that the addition of oxidizing material to the fibrous carrier 56 will act as a further safeguard to maintaining the catalyst free of the contaminating influence of stibine.

As an alternative procedure for treating the catalyst carrier to render the same water-repellent but gas permeable, there can be used a solution of methylated, chlorinated silanes in white gasoline or other neutral solvent. The silane reacts with surface moisture to liberate hydrogen chloride and leave an adherent water-repellent film of silicone resin on the surface of the catalyst carrier material.

In Figs. 14 to 16 the preferred form of the present invention is illustrated as embodied in the catalytic battery unit identified as 20B and which in its external appearance is essentially the same as the catalytic units 20 and 20A described hereinabove. In construction, the essential differences are in the manner in which the glass cap 140 is mounted on the understructure or housing generally indicated at 121 and the arrangement for the catalytic unit generally indicated at 100.

The housing 121 which affords the mounting for the glass cap 140 is in this instance in the form of a one-piece plastic molding which includes a lower extension in the form of a tube 126 which is adapted to open into the electrolytic cell, and the upper or cup-shaped portion 132 that is adapted to interfit in a sealing relation with the lower edge of the glass cap 140. Thus, the member 121 is molded or otherwise shaped to provide external threads 125 for connection to the electrolytic cell of the battery, and this lower section of the catalytic unit 20B is enlarged at 123 so as to provide a relatively large sealing flange to extend around the battery opening in concentric relation thereto. The housing 121 is formed with a relatively large lower chamber 129 through which the reactant gases travel in their upward passage toward the underside of the glass cap 140. A small wire screen 72 is secured in place over the portion of the extension 126 that leads into the lower chamber 129, and this screen is effective to prevent, in a large part, the entrance of liquids into the catalytic battery unit 20B.

The upper portion of the member 121 is generally cup-shaped in appearance and includes a smaller upper housing 132 which is adapted to interfit with the rim of the glass cap 140 to provide an air-tight seal between the two members. To this end, the glass cap 140, in addition to ventilating ribs and fins 143, 144 and 146, includes an annular protrusion or shoulder 142S that is adapted to fit into an annular groove 132G afforded on the inner wall of the housing 132. The groove 132G is configured complementary to the shoulder 142S, and the relation is such that the two may be forced into an interfit with a snap action during assemblage of the unit 20B. That is, the cup-shaped housing 132 of the member 121 is resilient enough to permit the cap 140 to be forced into the aforesaid interfitting relation, this forcing action being facilitated by providing complementary sloped surfaces 133S and 144S at the top of the housing 132 and at the lower edge of the shoulder 142S respectively so that these sloped surfaces will cause the walls of the cup 132 to be forced slightly outwardly as viewed in Fig. 14 during the time that the cap 140 and the lower structure 121 are being forced into an interfitting relation. Suitable sealing material 45 is provided to assure that the interfitting relation is subsequently maintained and the reactor chamber 141 defined by the interior of the glass cap 140 sealed off from the atmosphere.

In this instance, the catalyzing unit 100 is generally cone-shaped and comprises a cone-shaped holder 95 that is supported within the catalytic reactor chamber 141. The cone 95 is preferably made of some suitable ceramic material and is supported upright in an inverted position in any convenient manner with its apex resting on a glass baffle 173 that is extended across the throat of the lower chamber 129. The holder 95 of the catalyst material is formed with a plurality of symmetric and radial openings or apertures 96 and 97 which radiate outwardly from a central opening 98 provided on the apex of the cone 95, and it is these openings which permit passage of the reactant gases (hydrogen and oxygen) up into the interior of the holder 95.

In the present instance, the catalyst material arranged in the holder 95 is in the form of a plurality of palladium pellets 155 isolated and insulated from one another by uniform distribution throughout a highly compacted and highly porous carrier 156 that is packed in the holder 95. As in the case of the unit 20, the carrier 156 is in the form of finely divided asbestos fibers prepared as disclosed hereinabove to be water repellent but gas permeable. Supplementing the action of the highly porous carrier 156 as a further assurance to an equal distribution of the heats of reaction throughout the catalytic unit 100, a crescent-shaped nickel plated bronze screen 94 is arranged about and above the catalytic pellets 155 as a group. In its overall appearance, the screen 94 resembles the sector of a sphere.

The catalyst carrier material 156 is held in place within the cone 95 by means of another nickel plated wire screen 91 which is extended across the base of the cone-shaped holder 95 and secured in position by means of an annular overhanging lip-shaped extension 107 at the base of the cone 95.

In the catalytic battery units 20 and 20A, one feature of construction is the use of lead dioxide impregnated paper or cloth for neutralizing stibine gas. In the catalytic battery unit 20B the need for such impregnated strips is dispensed with and in their place the underside of the glass baffle 173 is roughened, Fig. 16, to provide a plurality of tiny grooves, nicks and crevices 173G. Such a finely roughened surface may be provided by etching, sand blasting, or any other convenient "abrading" procedure, and following this operation, the surface is rubbed with an oxidizing agent such as lead dioxide 71 which deposits itself in powder form in the grooves and crevices 173G.

It is, of course, essential to a practical and efficient operation that the catalyst material 155 be protected from the contaminating influence of liquid water. This is obtained in part, of course, by the water repellent nature of the carrier 156. However, additional protection is provided in this respect by lining the inside of the cone 95 and the underside of the screen 91 with waterproofed asbestos paper 92.

No particular construction is necessary for the ceramic cone 95, and another form is illustrated at 105 in Fig. 17. The cone 105 is formed with a plurality of vertical passages 106 for permitting passage of the reactant gases to the catalytic pellets 155. These openings 106 are circular and relatively small in nature, and are arranged in normal relation to the base of the cone 105. The base of the cone 105 is also formed with an annular over-hanging lip 107 which serves to hold a nickel plated bronze screen 91 in place, and it will be appreciated that the latter screen is arranged to maintain the catalytic pellets 155 and the carrier 156 (not shown in Fig. 16) in the desired relation.

In use and operation the catalytic battery cap 20B operates essentially the same as the units 20 and 20A described hereinabove. Thus, reactant gases, $H_2$ and $O_2$ pass upwardly from the electrolytic cell through the tube 126 and into chamber 129, the screen baffle 72 serving to eliminate large droplets or acid or like liquids from entering the chamber 129. The underside of the glass baffle 173 coated with $PbO_2$, is effective to oxidize any stibine gas which may be present in the ascending gases, and consequently the upwardly rising gases passing the glass baffle 173 and entering the reactor chamber 141 consist essentially only of hydrogen and oxygen. Molecules of the latter two gases permeate the holder 95 and eventually are metered on to the surface of the catalytic pellets 155 as a result of the highly porous nature of the fibrous carrier 156. This metering action assures an equal distribution of heats of reaction throughout the catalytic mass, and the screen 94 serves as a further assurance to the prevention of hot spots on the catalyst pellets. Hydrogen and oxygen combine on the catalyst surfaces to form water vapor, and this water vapor continues to rise upwardly in the chamber 141 until it reaches the underside of the glass cap 140 whereat there is a tendency for the water vapor to condense and form liquid droplets which drop downwardly into the chamber 141 towards the glass baffle 173. The water repellent nature of the carrier 156 prevents liquid water from reaching the catalyst 155, and in this manner a high efficiency is maintained at all times in the reactor chamber 141. Consequently there will be a downward flow of water at the glass baffle 173, and the tendency is to absorb any sulfuric acid vapors that may have reached this point inside the catalytic battery unit 20B.

From this it will be seen that the catalytic battery unit is so constructed and arranged that a very high degree of efficiency is attained in recombining hydrogen and oxygen to reform water for return to the electrolytic cell. The danger of the development of hot spots is eliminated, the presence of stibine gas is accounted for, and the collection of liquid water in the neighborhood of the catalyst material is prevented.

We claim:

1. A catalytic reactor unit adapted to be used with an electrolytic cell for recombining hydrogen and oxygen gases escaping from the cell to thereby form water to be returned to the cell, comprising a reactor chamber adapted to communicate with said cell, a catalyst unit arranged in the said reactor chamber and including a highly porous catalyst carrier coated with a water-resistant but gas-permeable coating, catalyst material arranged in and surrounded by said carrier to recombine the hydrogen and oxygen gases which may be evolved from the electrolyte to form water therefrom, and means permitting return of said recombined water in the form of liquid to the cell.

2. A catalytic reactor unit as defined in claim 1 in which the catalyst carrier is in the form of finely divided heat resistant particles.

3. A catalytic reactor unit as defined in claim 1 in which the said reactor unit includes a neutralizer for stibine gas, said neutralizer being in the form of a carrier holding an oxidizing agent for the hydrogen in stibline, $SbH_3$.

4. A catalytic reactor unit as defined in claim 1 which includes a neutralizer for stibine, $SbH_3$, supported in said reactor unit and comprising a carrier impregnated with an oxidizing agent, and baffle means in said reactor unit adapted to prevent the passage of liquid mists and sprays or the like into said reactor chamber.

5. A catalytic reactor unit to be used with a storage battery for recombining hydrogen and oxygen gases escaping from the cell of said battery as the result of an electrolysis of the battery water, to form water to be returned to the cell in the form of a liquid comprising a housing having a passageway adapted to communicate with the space directly above said battery cell, a reactor chamber in communication with said housing, a catalyst unit located in said reactor chamber and including a catalyst material adapted to catalyze hydrogen and oxygen gas to form water for return to said cell through said housing, said catalyst material being protected against corrosion and surrounded by a highly porous carrier coated with a gas permeable but water resistant material whereby said catalyst material is maintained free of contact by liquid water, and a neutralizer for stibine gas supported in said reactor unit and comprising a carrier impregnated with an oxidizing agent.

6. A catalytic reactor unit according to claim 5 which includes a baffle means to prevent the passage of liquid mists and sprays or the like into said reactor chamber.

7. A catalytic reactor unit according to claim 5 in which said carrier also contains an oxidizing agent.

8. A catalytic reactor unit according to claim 5 in which the coating on the carrier is a substance of the group consisting of Teflon and silicone resins and in which said catalyst is a metal of the group consisting of platinum and palladium.

9. A catalytic reactor unit adapted to be used with electrolytic cells and including a catalyst material for catalytically recombining hydrogen and oxygen gases escaping from said cell as the result of an electrolysis therein, a housing including a reactor chamber for removable attachment to said cell whereby said reactor chamber and electrolytic cell are in communication, a catalyst unit including said catalyst material mounted in said reactor chamber to intercept the gases flowing therein from said cell, said catalyst unit comprising a highly porous carrier arranged about the catalyst material to meter said gases uniformly and regularly to the surface of the catalyst material, said carrier being provided with a gas permeable but water repellent surface to thereby assure that said catalyst material is maintained free of liquid water, a baffle means arranged in said housing to prevent the direct passage of liquid mists and sprays or the like into said reactor chamber, and means to condense the recombined water and permit return of the same back to the electrolytic cell.

10. A reactor unit according to claim 9 in which the catalyst material is in the form of pellets of the class consisting of platinum and palladium, and in which said carrier is in the form of finely divided asbestos fibers arranged between foraminous screen members to assist in maintaining said pellets in separable relation one to another.

11. A reactor unit according to claim 9 in which said catalyst material is represented by a surface coating on a piece of asbestos paper, said catalyst material being arranged between additional pieces of asbestos paper.

12. A catalytic reactor unit adapted to be used in conjunction with an electrolytic cell to recombine constituent gases escaping therefrom comprising, a reactor chamber into which said gases may be led, passage means for directing said gases to said chamber, and a catalyst unit arranged in said chamber to intercept the path of said gases, said catalyst unit including catalyst surfaces surrounded by a highly porous intervening insulation of a gas-porous but water repellent nature.

13. A catalytic reactor unit adapted to be used with an electrolytic cell for recombining hydrogen and oxygen gases escaping from the cell to thereby form water to be returned in liquid form to the cell comprising, a reactor chamber adapted to be arranged in communication with said cell, a catalyst unit in the form of a porous and open-bottomed cone-shaped holder removably arranged in an inverted position with said chamber, said holder being packed with a finely divided and highly porous fibrous carrier in which is distributed a catalyst material, said carrier being of a water repellent but gas permeable nature whereby said catalyst material is maintained free of condensing water, and means affording passage of reactant gases from the cell to the catalyst material and the return of recombined water in the form of liquid to the cell.

14. A catalytic reactor unit according to claim 13 which includes a baffle below said holder, the underside of said baffle being coated with an oxidizing agent to neutralize any stibine gas that may be generated in said cell.

15. A catalytic reactor unit according to claim 13 in which the inside surface of said cone-shaped holder is provided with a porous waterproof liner.

16. A catalyst unit adapted to be used with an electrolytic cell to effect re-combination of hydrogen and oxygen gases evolved during use of the cell comprising, a porous container adapted to permit said gases to pass therethrough, a finely divided catalyst carrier of a heat-resistant and water-repellent nature packed into said carrier, and catalyst material for recombining hydrogen and oxygen gases uniformly distributed in said carrier whereby said gases are uniformly metered on to the catalyst material and the latter is protected against the deleterious effect of condensed water.

17. A catalyst unit according to claim 16 in which said carrier is in the form of finely divided asbestos fibers coated with a water-repellent coating material.

18. A catalyst unit according to claim 16 in which said container is lined with water-repellent asbestos paper.

19. A catalyst unit according to claim 16 in which said carrier is in the form of finely divided asbestos fibers each coated with a water-repellent coating and in which said container is lined with water-repellent asbestos paper containing a neutralizer for stibine gas.

20. A catalyst unit adapted to be used with an electrolytic cell to effect re-combination of hydrogen and oxygen gases evolved during use of the cell comprising, a porous cone-shaped container adapted to permit said gases to pass therethrough, a finely divided catalyst carrier of a heat-resistant and water-repellent nature packed into said carrier, and catalyst material for recombining hydrogen and oxygen gases uniformly distributed in said carrier whereby said gases are uniformly metered on to the catalyst material and the latter is protected against the deleterious effect of condensed water.

21. A catalyst unit according to claim 20 in which said container is lined with water-repellent asbestos paper and in which a non-corrosive metal member is arranged in said carrier to assist in dissipating the heats of reaction evolved in said carrier during re-combination of hydrogen and oxygen.

22. A catalytic reactor unit adapted to be used with electrolytic cells and including a catalyst material for catalytically recombining hydrogen and oxygen gases escaping from said cell as the result of an electrolysis therein, comprising a housing including a reactor chamber for attachment to said cell whereby said reactor chamber and electrolytic cell are in communication, said catalyst material being arranged in said reactor chamber to intercept the gases flowing therein from said cell, a highly porous carrier arranged about the catalyst material to meter said gases uniformly and regularly on to the surface of the catalyst material, said carrier being provided with a gas permeable but water repellent surface to thereby assure that said catalyst material is maintained free of liquid water, and means to assist in condensing the recombined water for return as a liquid back to the electrolytic cell.

23. A reactor unit according to claim 22 in which said carrier is in the form of finely divided asbestos fibers.

24. A reactor unit according to claim 23 in which said catalyst material is represented by pellets selected from the group consisting of platinum and palladium.

References Cited in the file of this patent

UNITED STATES PATENTS

| Number | Name | Date |
|---|---|---|
| 2,465,202 | Craig | Mar. 22, 1949 |

FOREIGN PATENTS

| Number | Country | Date |
|---|---|---|
| 339,824 | Great Britain | Dec. 18, 1930 |